Figure 1:
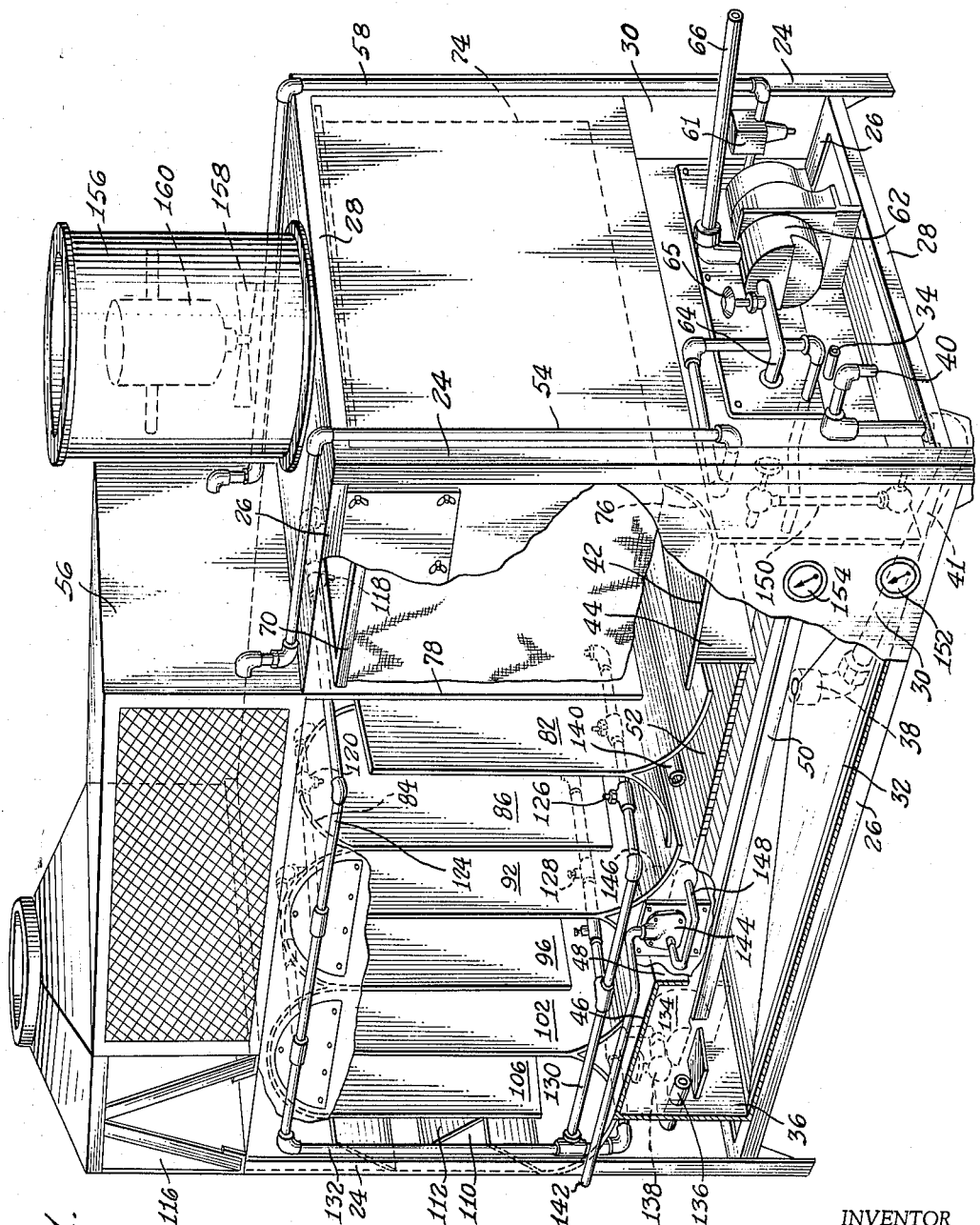

April 19, 1966  K. S. ARVANITAKIS  3,246,452

DEVICE FOR RECOVERING LIQUID FROM AIR

Filed June 24, 1963  2 Sheets-Sheet 1

INVENTOR
Kostas Savas Arvanitakis

BY
ATTORNEY

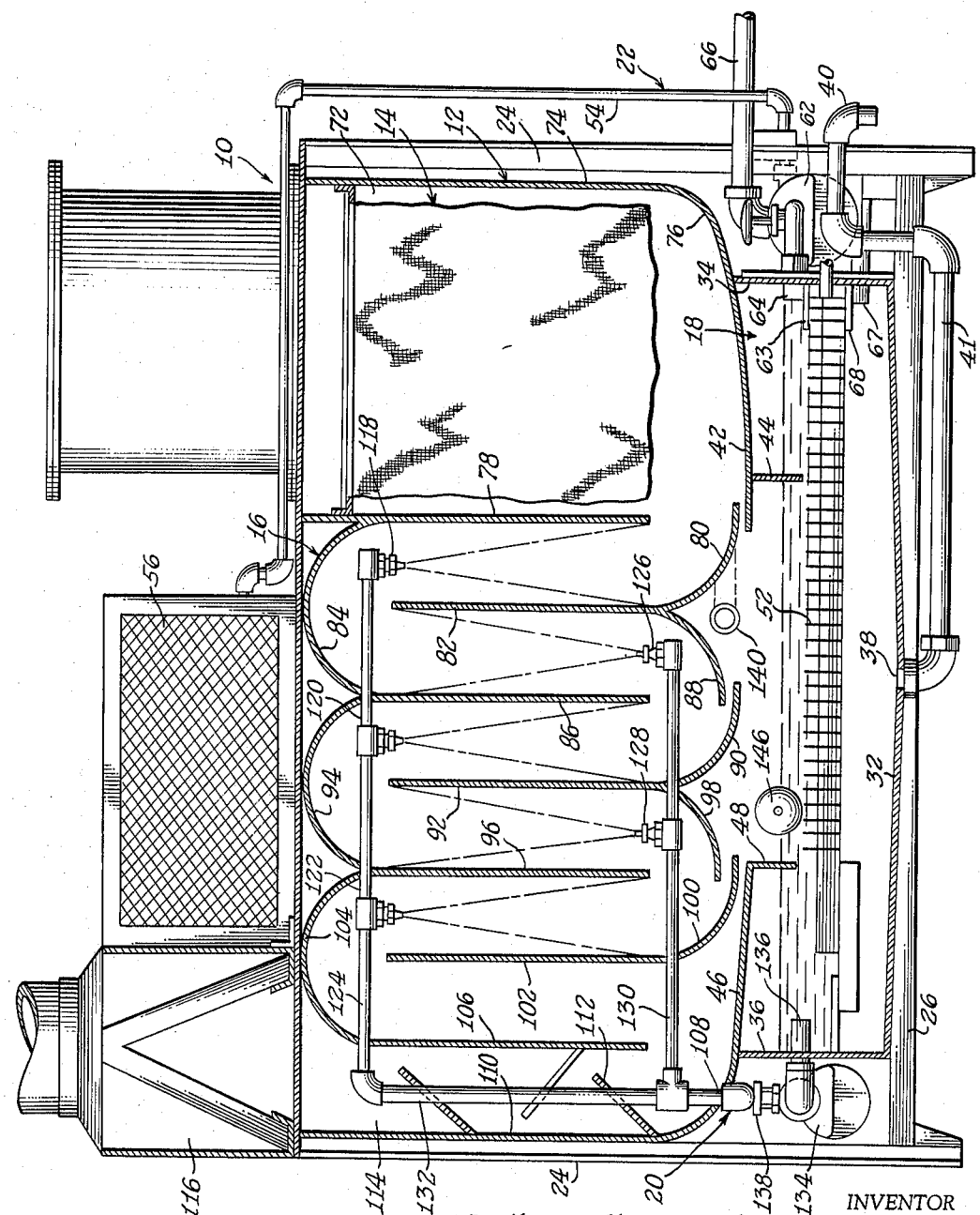

United States Patent Office 3,246,452
Patented Apr. 19, 1966

3,246,452
DEVICE FOR RECOVERING LIQUID FROM AIR
Kostas Savas Arvanitakis, 5208 W. Congress, Chicago, Ill.
Filed June 24, 1963, Ser. No. 290,144
2 Claims. (Cl. 55—228)

This invention relates to a device for recovering liquid from air, and more particularly to a device for recovering dry cleaning solution carried in a continuous air stream.

It may be readily appreciated that with the advent of coin-operated dry cleaning units wherein a number of dry cleaning units are set up in a given location, the amount of air used to carry away dry cleaning solution fumes has been increased in order to protect the general public. It is apparent that when the amount of air is increased, more dry cleaning solution is carried away. It is desirable to recover the dry cleaning solution carried away for two reasons. One reason is that economics may be effected by recovering the solution; that is, the solution may be recaptured and reused so that substantial solution need not be wasted. In addition, by recapturing the solution and returning it to the dry cleaning units, the air which is expelled is a clean pure air rather than air laden with solution. Thus, the air is not polluted by a dry cleaning solution. Many systems for recovering dry cleaning solution from air are provided. In most instances, each of these systems uses a batch process which is acceptable for a low volume operation. However, in a high volume operation, it is desirable to have a continuous system for recovering the solution. Furthermore, it is desirable to cool the solution before it is returned to the dry cleaning units. It is, therefore, a principal object of the instant invention to provide a device for recovering dry cleaning solution carried in a continuous stream of air by a continuous process.

It is a further object of the present invention to provide a device for recovering solution carried in air, and for cooling the solution simultaneously, with recovering the solution.

It is still another object of this invention to provide a device which is economical to manufacture, and which may be used to recapture dry cleaning solution carried in air in a continuous flow process, which device is simple to operate and economical to manufacture.

Other objects and uses of the present invention will become readily apparent to those skilled in the art upon a perusal of the following specification in light of the accompanying drawings in which:

FIGURE 1 is a perspective view of a device embodying the herein disclosed invention with one side removed to show the interior construction of the device; and FIGURE 2 is a cross-sectional view of the device shown in FIGURE 1, but showing a side elevation of the device.

Referring now to the drawings, it may be seen that a dry cleaning solution recovery device embodying the herein disclosed invention is generally indicated by numeral 10. The device 10 generally includes a frame 12, a lint bag 14 mounted in the frame, a water spray air path 16 mounted within said frame, a settling tank 18 below said water spray air path, a recirculating system 20 for collecting water in the tank and delivering it into the water spray air path, and a chilling system 22 which is mounted on the frame and in cooperation with the settling tank to cool water and solution recovered by the device.

It may be seen that the frame is conventional in its construction, inasmuch as the frame includes four uprights 24. The uprights 24 are connected by a plurality of longitudinal members 26 and a plurality of end members 28. As may be seen in FIGURE 1, the longitudinal members 26 are connected in pairs to a pair of uprights 24 to form the sides of the frame. The end members 28 are also connected in pairs to connect the sides to form a unitary structure. Each of the sides has a side wall 30 connected thereto in order to complete the frame.

Mounted on the bottom of the frame is the settling tank 18. The settling tank has a transition bottom 32 resting on a pair of longitudinal members 26. The bottom 32 has opposite edges sealingly fixed to the side walls 30, and a pair of tank end walls 34 and 36 are sealingly fixed to the bottom 32 as well as the side walls 30. The bottom 32 of the tank has a drain 38 at its lowest point and is connected to an outlet 40 through piping 41. A lint bag splash board 42 is fixed to the end wall 38 in a substantially horizontal position to sloping toward the center. Fixed to the lint bag splash board is an outlet baffle 44 which extends downward into the tank in order to provide a space between the baffle 44 and the end wall 34. On the opposite end of the tank is an inlet splash board 46 which is also substantially horizontal though sloping toward the center. The inlet splash board has an inlet baffle 48 fixed thereto and extending downward to approximately the same depth as the outlet baffle. Mounted between the end walls 34 and 36 is a heat exchange rack 50.

Mounted on the heat exchange rack is a plurality of heat exchangers 52. The heat exchangers 52 are conventional in their construction, in that they have a plurality of fins and the inlet to the heat exchangers is a chiller outlet pipe 54 which is connected to the output of a conventional chiller 56, which chiller 56 is designed for the purpose of cooling water. The inlet to the chiller is chiller inlet pipe 58. The pipe 58 is connected to the heat exchangers. An automatic temperature responsive valve 61 is mounted on the outlet of the heat exchangers to control the flow of water to the chiller, which chiller has a pump (not shown) to circulate the water. The inlet pipe 58 is connected to the outlet of the heat exchangers in a well known manner, though not shown.

A water recovery pump 62 is mounted on the frame 12. The water recovery pump takes water from a water pump inlet 64 which is connected to the interior of the tank 18 in an opening in end wall 34. Positioned below inlet 64 is a baffle plate 63 which prevents contamination of the water by any turbulence which may occur at the inlet. A valve 65 is used to regulate the amount of water taken into the pump. The pump 62 delivers water through outlet piping 66 to an appropriate dry cleaning unit, which unit is not shown herein. A secondary inlet 67 is provided below inlet 64. The secondary inlet is provided to provide a means for delivering dry cleaning solution to the dry cleaning unit with pump 62 rather than water. A baffle plate 68 is positioned above the inlet 67 for the same reasons that baffle 63 is positioned below inlet 64.

As was mentioned above, the lint bag 14 is mounted in frame 12. The lint bag 14 is mounted on a lint bag frame 70 which is attached to the frame 12. The lint bag is in a lint bag compartment 72. The lint bag compartment 72 is made up partially by the side walls 30, and a front wall 74 which is fixed to a pair of uprights 24 as may be clearly seen in FIGURE 1. The front wall 74 has a curved section 76 which blends into the lint bag splash board 42, as is clearly evident in FIGURE 2. The lint bag compartment is completed by a lint bag compartment rear wall 78 which is substantially vertical and extends down the depth of the lint bag. However, there is a space between the bottom of the lint bag rear wall and the lint bag splash board 42, so that air may freely flow there-between into the water spray air path 16.

The above-mentioned path commences at the end of the lint bag compartment. A first curved section 80 extends between the side walls 30 and defines a curve with a space between the bottom of the curved section 80 and the top of the lint bag splash board so that water may flow down the curved section and between the splash board and the curved section to be delivered to the settling tank. The curved section 80 blends into a first vertical baffle 82. Spaced from the first vertical baffle 82 is a semi-circular change directing baffle 84 which is attached to the rear wall 78 of the lint bag compartment and blends into a second vertical baffle 86. The first vertical baffle 82 has a second curved section 88 blending therein and spaced from the second vertical baffle 84. A third curved section 90 overlaps the second curved section 82 and is spaced slightly therefrom. The third curved section blends into a third vertical baffle 92 which has a second semi-circular curved section 94 spaced therefrom. The second section 94 is attached at one edge to the second vertical baffle 86 and the opposite edge is attached to a fourth vertical baffle 96. The third vertical baffle 96 has a fourth curved section 98 extending in a direction opposite from the third curved section 90. The fourth curved section 98 is spaced from the bottom of the fourth vertical baffle 96 to provide a free air path between the two parts. A fifth curved section 100 overlaps slightly and is spaced from the fourth curved section 98. The fifth curved section 100 blends into a fifth vertical baffle 102. A third semi-circular curved section 104 has one edge fixed to the fourth vertical baffle 96, and its opposite edge sealingly attached to a dry vertical baffle 106, which is spaced from baffle 102. The dry vertical baffle 106 has a curved section 108 spaced therefrom to provide a free air flow path between the curved section 108 and the baffle. The curved section 108 has one edge blending in with the inlet splash board 46 and the opposite edge is sealingly fixed to a back wall 110.

The back wall 110 and the dry baffle 106 provide a drying path 114. The drying path 114 has a plurality of drying baffles 112 positioned therein to provide a tortuous or serpentine path between the back wall and the drying baffle. The drying path extends into an exhaust section 116, which is mounted on top of the frame 12 and adjacent to chiller 56.

In order to provide water to the water spray air path 16, a water spray which is part of the recirculating system 20 is provided between the baffles. Three downward spray nozzles 118 are positioned between the rear wall 78 and the first vertical baffle 82. Three downward spray nozzles 120 are positioned between the second vertical baffle 86 and the third vertical baffle 92. Three downward spray nozzles 122 are positioned between the fourth vertical baffle 96 and the fifth vetrical baffle 102. The spray nozzles 118, 120 and 122 are connected to a downward spray pipe 128. Three upward spray nozzles 126 are positioned between baffles 82 and 86 and three upward spray nozzles 128 are positioned between baffles 92 and 96. The upward spray nozzles 126 and 128 are connected to a pipe 130. The pipe 130 and the pipe 124 are connected to a common pipe 132. The common pipe 132 in turn is connected to a spray pump 134.

In order to conserve water, the spray pump 134 has its inlet connected to an inlet pipe 136 which inlet pipe extends into the tank 18 through end wall 36. A valve 138 is connected between the inlet pipe 136 and the inlet of pump 134 in order to regulate the amount of water taken into the pump. It is evident that pump 134 takes water from the tank and delivers it to the spray nozzles which spray nozzles dispel the water into the water path, and the water is returned back to the settling tank to be used again. It is evident that though the water is returned, a certain amount of water is carried away by the air and must be replenished.

Water is replenished to the instant device from a conventional source of water which is not shown. The conventional source of water is connected to a water supply pipe 142. The water supply pipe is connected to the water supply inlet valve 144. The valve 144 is controlled by a float 146 which floats on the top of the liquid level in the settling tank 18. The float works in a conventional fashion in that when the water level goes down, the float drops down and water is delivered to the tank through a delivery pipe 148. When sufficient water is added to the tank to raise the liquid level, the float rises to a sufficient height to shut off the valve 144. It may be noted that at this point though the water is being drawn off through pipe 64 to be supplied to the dry cleaning unit, the water is returned from a dry cleaning unit by means of a return pipe 140, which is connected to the dry cleaning outlet.

In order to provide an operator information as to the operation of the present device, certain gauges are provided. It may be noted that a liquid level gauge 150 is attached to the end wall 34 in order to show the level of the liquid in the tank. Furthermore, two temperature gauges are attached to the side wall 30. A lower temperature gauge 152 indicates the temperature in the lower portion of the tank and an upper temperature gauge 154 shows the temperature in the upper level of the tank. It may be noted that both temperature gauges are positioned adjacent to end wall 32 so that the temperature of a layered level of liquid is shown rather than one in which the liquids have not separated by settlement.

The instant device is connected to the outlet of an air exhaust of a dry cleaning unit through appropriate piping and through an inlet section 156. A fan 158 mounted is mounted in section 156 and the fan is driven by a motor 160, so that air taken from the exhaust from and around a dry cleaning machine is forced into the present device to have the dry cleaning solution removed.

The present device operates in the following manner. The air from a dry cleaning unit is collected in the inlet 156 and driven through the lint bag 114. In the lint bag, various pieces of foreign particles, such as, lint or even particles of dirt, are trapped in the lint bag. The air carrying the dry cleaning solution then flows between the bottom of rear wall 78 and the top of the splash board 52 and is directed upward by the curved section 80 so that the air flows up between the baffle 82 and the rear wall 78. It may be noted that the three spray nozzles 118 are delivering a water spray into that portion of the path against the direction of flow of the air. The air flowing into this section is cooled by the water spray and the solution carried by the air is condensed and falls down with the water. The water and solution mixture flows down along the baffle, along the curved section and then is returned to the settling tank 18 by flowing between the space between the curved section 80 and the splash board 42. The air continuing on its way is reversed by the section 84, so that it engages an upward spray from the nozzles 126. The air is further cooled. The air flows downward and is reversed again by the curved sections 88 and 90, so that the air engages the spray from the downward nozzles 120. It may be noted that the water sprayed by the nozzles 126 and 120 may fall down to the curved sections 88 and 90 and the water then flows between the space between the curved sections 88 and 90 and into the settling tank 18.

It should be noted that the curved sections have an overlap so that there is no interference of flow of the air. The air makes its curve around the bottom of the vertical baffle 82 so that it starts to flow upward, but there is little or no opportunity for the air to flow down into the settling tank. The air then flows upward until its path is changed by the curved section 94, and it engages the water spray from the nozzles 128. The direction of the air is changed by the curved section 98 and the curved section 100, so that the air comes around the vertical baffle 96 and engages the spray from the nozzles 122. Again, the water with any solution is returned to the settling tank between the curved sections 98 and 100. The air has its direction changed again by the curved section 104. At this point, no further spray is delivered to the air, but rather the air flows downward so that any particles of water that may be carried in the air are allowed to drop on top of the splash board 46 and be returned to the settling tank. The air then engages the curved section 102 and flow upward between the rear wall 110 and the vertical baffle 106.

As was mentioned above, a plurality of drying baffles 112 are positioned in the section between the rear wall and the vertical baffle. These baffles also provide for additional fall-out of any material which is carried by the air. The air is then delivered to the exhaust section 116 where it may be delivered to the outside air clean and pure.

It should be noted that any water that is returned to the tank with the solvent contained in the tank is settled out. For the purposes of this disclosure, it is assumed that the dry cleaning solution used is perchlorethylene. The solution is carried by the air and is cooled by the water so that it drops out into the settling tank. The solution and water mixture drops between the two vertical baffles 44 and 48. It should be noted that at this point there is a considerable amount of mixture. In view of the fact that the perchlorethylene is heavier than water, it settles down to the bottom. The solution is drained out through drain 88 and is returned to a dry cleaning unit or to a storage tank.

The water is reused. The water is collected by the inlet pipe 64 and returned to a dry cleaning unit through pipe 66. The water is, of course, driven by pump 64. The amount of water may be regulated by the valve 65. As was mentioned above, the water used in the spray is recirculated. The inlet pipe 136 collects the water behind the baffle 48. It may be noted that the water is not the disturbed water, but rather the water has had an opportunity to settle out, and the agitated water is all between the two baffles 44 and 48. The water is taken through inlet pipe 136 and pumped to the spray nozzles by pump 134. The rate of pumping may be adjusted by the valve 138. The water is delivered to the common pipe 132 and then to pipes 130 and 124 where the water is sprayed into the water spray path. It should be noted that when the water is returned to the settling tank, it is cooled by the heat exchangers 52. The cooling aids in the settling of the water and the dry cleaning solution. The heat exchangers are cooled by a water which flows from the chiller 56 to the heat exchangers 50. From the heat exchangers 50, the water returns to inlet pipe 58. The amount of water delivered to the inlet pipe 58 is regulated by the automatic temperature valve 61.

It should be noted that the present device performs a dual function of both cooling the water for the dry cleaning units as well as recovering solvent from the dry cleaning units. This double action provides a highly economical unit which may be readily installed in an established professional dry cleaning unit, or a coin-operated station. The advantages of this unit are self-evident in that the solution which would normally be expelled into the air is recovered from the air and salvaged to be used again. Furthermore, the air is purified before it is delivered to the out-of-doors.

Other advantages and uses of the instant device will be appreciated by those skilled in the art, and they may make various modifications and changes without departing from the spirit and scope of the present invention. It is to be expressly understood that the present invention is limited only by the appended claims.

What is claimed is:

1. A device for recovering dry cleaning solution carried in a continuous air path comprising, in combination, a frame, a plurality of baffles mounted in said frame, a plurality of curved sections joining alternate baffles at the upper portion thereof to provide a reversing portion for the air path, a first curved one-half section connected to a baffle, a second curved one-half section connected to a second baffle and being spaced from and overlapping the first curved one-half section to allow liquid to flow between the one-half sections and provide a reversing portion for the air path, a water spray between the baffles to cool the air flowing there-between, a tank mounted on said frame below the baffles to collect liquid from said air path, and a heat exchanger mounted in the upper portion of the tank for affecting the temperature of liquid caught in the tank.

2. A device for recovering dry cleaning solution carried in a continuous air stream comprising, in combination, a frame, a lint bag mounted in said frame and being in an air path for removing particles of lint and other foreign matter from the air, a series of vertical baffles mounted in said frame determining an up and down air path communicating with the air path from the lint bag, the upper portions of a plurality of the baffles being connected to air turning sections to reverse the flow of air around the baffle, a second plurality of the baffles having their lower edges connected to curved sections which curved sections partially overlap each other to form a turn around section and to provide a space for liquid to flow out of the curved sections, water sprays mounted between adjacent baffles and operating in a direction opposite to the flow of air between the respective baffles, a dry path communicating with said air path for removing liquid particles from the air, said dry path having a serpentine portion to eliminate liquid particles, a tank mounted in said frame below the air path for collecting the water and the dry cleaning solution from the air path which flows out of the curved sections, a baffle section on each of opposite edges of the tank to provide non-turbulent sections for recovering liquid from the tank, a drain in the bottom of the tank for recovering a second liquid which has settled out of the tank, and a heat exchanger mounted in the tank adjacent to the upper portion thereof for exchanging heat with water and dry cleaning solution entering the central portion of the tank between the baffle sections.

References Cited by the Examiner

UNITED STATES PATENTS

| | | | |
|---|---|---|---|
| 1,620,826 | 3/1927 | Mitchell | 261—22 |
| 2,057,579 | 10/1936 | Kurth | 55—220 X |
| 2,484,277 | 10/1949 | Fisher | 55—223 |
| 2,575,359 | 11/1951 | Ortgies | 55—238 X |
| 2,976,949 | 3/1961 | Murphy et al. | 55—238 |
| 3,064,408 | 11/1962 | Erga et al. | 55—258 X |
| 3,104,936 | 9/1963 | Fuhring | 55—85 X |

REUBEN FRIEDMAN, *Primary Examiner.*

J. ADEE, *Assistant Examiner.*